United States Patent
Waldis et al.

(10) Patent No.: US 7,260,465 B2
(45) Date of Patent: Aug. 21, 2007

(54) RAMP IDENTIFICATION IN ADAPTIVE CRUISE CONTROL

(75) Inventors: Andrew Waldis, Lake Orion, MI (US); Gerald H. Engelman, Plymouth, MI (US); Melvin Douglas Palmer, Allen Park, MI (US); Thomas Edward Pilutti, Ann Arbor, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 164 days.

(21) Appl. No.: 10/063,501

(22) Filed: Apr. 30, 2002

(65) Prior Publication Data

US 2003/0204299 A1  Oct. 30, 2003

(51) Int. Cl.
  *B60K 31/00* (2006.01)
  *G01C 21/32* (2006.01)
(52) U.S. Cl. .......... 701/96; 300/205; 300/207; 300/93; 340/905; 340/995.2; 340/995.21
(58) Field of Classification Search .......... 701/96, 701/65, 55, 95, 24, 54, 208, 93, 121, 301, 701/300, 205, 207, 200; 342/46.47, 70, 69; 180/167, 168, 170; 340/436, 905, 995.2, 340/995.21, 907, 990, 995; 123/352
See application file for complete search history.

(56) References Cited

U.S. PATENT DOCUMENTS

| | | | |
|---|---|---|---|
| 4,670,845 A | 6/1987 | Etoh | |
| 5,485,161 A | 1/1996 | Vaughn | |
| 5,745,870 A | 4/1998 | Yamamoto et al. | |
| 5,771,007 A | 6/1998 | Arai et al. | |
| 5,854,987 A * | 12/1998 | Sekine et al. | 701/41 |
| 5,902,345 A | 5/1999 | Minowa et al. | |
| 5,928,299 A * | 7/1999 | Sekine et al. | 701/41 |
| 5,977,869 A | 11/1999 | Andreas | |
| 6,085,137 A * | 7/2000 | Aruga et al. | 701/51 |
| 6,125,324 A * | 9/2000 | Matsuda et al. | 701/208 |
| 6,141,619 A * | 10/2000 | Sekine | 701/93 |
| 6,161,072 A * | 12/2000 | Clapper | 701/93 |
| 6,320,515 B1 * | 11/2001 | Olsson | 340/905 |
| 6,343,253 B1 * | 1/2002 | Matsuura et al. | 701/200 |
| 6,418,367 B1 * | 7/2002 | Toukura et al. | 701/54 |
| 6,473,685 B2 * | 10/2002 | Kuroda et al. | 701/96 |
| 2001/0056326 A1 * | 12/2001 | Kimura | 701/208 |
| 2002/0031242 A1 * | 3/2002 | Yasui et al. | 382/104 |
| 2002/0042672 A1 * | 4/2002 | Shiiba et al. | 701/65 |
| 2002/0080617 A1 * | 6/2002 | Niwa et al. | 362/465 |
| 2002/0095246 A1 * | 7/2002 | Kawazoe | 701/1 |
| 2002/0173903 A1 * | 11/2002 | Phung et al. | 701/117 |
| 2003/0023369 A1 * | 1/2003 | Takashima | 701/208 |
| 2003/0135318 A1 * | 7/2003 | Tellis et al. | 701/96 |

FOREIGN PATENT DOCUMENTS

JP         10329576 A   * 12/1998

* cited by examiner

*Primary Examiner*—Jack Keith
*Assistant Examiner*—Tuan C To
(74) *Attorney, Agent, or Firm*—Jennifer M. Stec; Artz & Artz (57) ABSTRACT

A control system 20 for an automotive vehicle 22, such as an adaptive cruise control system, is provided including a navigation system 34. The navigation system 34 includes a global positioning system 38. The navigation system 34 detects a ramp and generates a navigation signal including navigation data and map data. A controller 24 is electrically coupled to the navigation system 34. The controller 24 in response to the navigation signal adjusts the speed of the vehicle 22.

8 Claims, 8 Drawing Sheets

RAMP IDENTIFICATION IN ADAPTIVE CRUISE CONTROL

CROSS REFERENCE TO RELATED APPLICATIONS

The present invention is related to U.S. patent application Ser. No. 10/063,498 entitled "Object Detection in Adaptive Cruise Control" filed simultaneously herewith and incorporated by reference herein.

BACKGROUND OF INVENTION

1. Technical Field

The present invention relates generally to vehicle adaptive cruise control systems, and more particularly to a method and apparatus for adjusting vehicle speed and inhibiting vehicle resume speed when a ramp is detected.

2. Background of the Invention

Adaptive Cruise Control (ACC) has reached a level of technical and business readiness that it is beginning to appear in the consumer market as a comfort and convenience system. Consumer technical enthusiasm for ACC has increased because of their interest in intelligent vehicles and systems such as collision warning. ACC performs as an enhancement to traditional cruise control by automatically adjusting the set speed to allow a vehicle to adapt to moving traffic.

Under normal driving conditions the ACC system is engaged with a set speed equal to a maximum autonomous speed which is desired by the operator, referred to as a set speed, and the ACC system operates in a conventional cruise control mode. The ACC system continuously adjusts the speed of the vehicle to maintain the set speed. The ACC system uses radar to detect target vehicles in a future path of the vehicle. When the vehicle approaches traffic, thereby becoming a follow vehicle, the ACC system automatically adjusts the set speed to follow the traffic at a desired headway distance. The desired headway distance is a predetermined distance that the follow vehicle remains behind a detected target vehicle. When the traffic clears or the follow vehicle changes lanes the ACC system slowly resumes the speed of the vehicle back to the set speed. When the follow vehicle approaches slow traffic the ACC system is automatically disengaged and the operator manually follows slower vehicles in the slow traffic. When the slow traffic is no longer in front of the vehicle the operator pushes the resume button and the ACC system accelerates the vehicle back to the set speed.

Current ACC systems are unable to detect the difference between a road and an exit ramp. Therefore, the follow vehicle may accelerate to the set speed when entering an exit ramp and no longer detecting a target vehicle.

It would therefore be desirable to develop an ACC system that adjusts the vehicle resume behavior in response to the presence of a ramp.

SUMMARY OF INVENTION

The forgoing and other advantages are provided by a method and apparatus of adjusting vehicle speed and inhibiting vehicle resume speed using an adaptive cruise control (ACC) system. An ACC system of a vehicle is provided including a navigation system. The navigation system includes a global positioning system and a map database. The navigation system detects a ramp and generates a navigation signal including navigation data and map data. A controller is electrically coupled to the navigation system. The controller in response to the navigation signal adjusts the speed of the vehicle.

The present invention has several advantages over existing ACC systems. One advantage of the present invention is that it prevents automatic resume when the vehicle is near an exit ramp.

Yet another advantage of the present invention is that it prevents false accelerations on exit ramps when the ACC system is in auto resume mode. Therefore, reducing the number of automatic resume cycles when the vehicle is on an exit ramp and an object is no longer in the future path of the vehicle, enhances collision avoidance.

Additionally, the present invention allows automatic resume when the vehicle is on a high-speed connector ramp.

BRIEF DESCRIPTION OF DRAWINGS

For a more complete understanding of this invention reference should now be had to the embodiments illustrated in greater detail in the accompanying figures and described below by way of example.

DETAILED DESCRIPTION

In the following figures the same reference numerals are used to refer to the same components. Also in the following description, various operating parameters and components are described for one constructed embodiment. These specific parameters and components are included as examples and are not meant to be limiting.

While the present invention is described with respect to an apparatus and method for adaptively adjusting the speed of an automotive vehicle using a control system the following adaptive speed control apparatus and method is capable of being adapted for various purposes and is not limited to the following applications: cruise control systems, forward collision warning systems, collision avoidance systems, vehicle systems, or other systems that may require adaptive speed control.

Figure 1A:
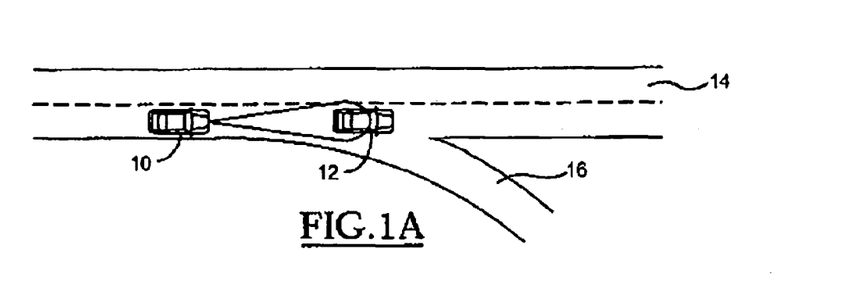
FIG. 1A is a placement diagrammatic view of a vehicle using an adaptive cruise control (ACC) system following a target vehicle and approaching an exit ramp.
Figure 1B:
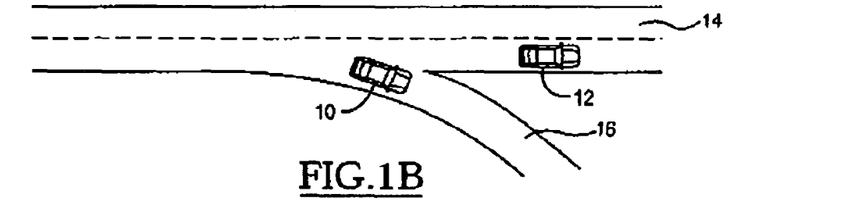
FIG. 1B is a placement diagrammatic view of the vehicle in FIG. 1A, using an ACC system, no longer following the target vehicle and entering the exit ramp.

Referring now to FIGS. 1A and 1B, placement diagrammatic views of an automotive vehicle 10 using an ACC system initially following a target vehicle 12 and approaching a ramp 16 followed by no longer following the target vehicle 12 and entering the ramp, are shown. In FIG. 1A, a vehicle 10 is using an ACC system following a target vehicle 12 on road 14 and approaching a ramp 16. In FIG. 1B, after vehicle 10 has been following a target vehicle 12, it proceeds onto the ramp 16. A ramp is a road segment that allows a vehicle to enter or exit another road. A ramp may include but is not limited to an: exit ramp, off ramp, on ramp, high-speed connector ramp, or any other road segment that provides a method of allowing a vehicle to enter or exit another road. A typical ACC system would initiate an automatic resume and accelerate the vehicle 10 to the set speed. This is in contrast to the control system 20 of the present invention which detects the ramp 16 and initiates an inhibit resume mode to prevent the vehicle 10 from accelerating. An assumption for the situation above described is that the set speed is greater than current follow of the vehicle 10.

Figure 2:
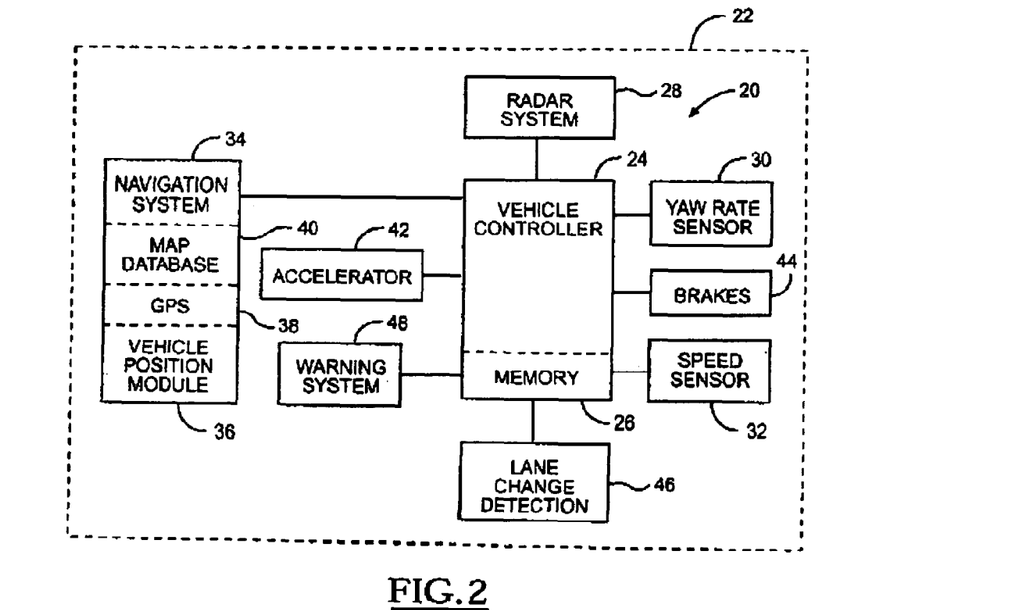
FIG. 2 is a block diagrammatic view of a control system according to an embodiment of the present invention.

Referring now to FIG. 2, a block diagrammatic view of a control system 20 located in a vehicle 22 according to an embodiment of the present invention is shown.

The system 20 includes a vehicle controller 24 that is preferably microprocessor-based. Controller 24 is illustrating having a memory 26 therein for storing information related to vehicle position, target vehicle position, and vehicle characteristics. However, memory 26 may also be a separate component. The controller 24 receives signals from several sensors and systems located within the vehicle 22.

The controller 24 receives a detected target vehicle signal from a detection system 28. Although the detection system 28 of the present invention is radar based the detection system 28 may be laser based, infrared based, x-ray based, or based off other detection methods known in the art. The target vehicle signal consists of a target vehicle location relative to the vehicle 22 and a road on which the vehicle 22 is being operated. The target vehicle signal also consists of a distance value between the target vehicle and the vehicle 22 and the speed of the target vehicle relative to the speed of the vehicle 22.

The controller 24 measures the yaw rate of the vehicle 22 using a yaw rate sensor 30, which generates a yaw rate signal corresponding to the yawing of the vehicle about an axis extending vertically at the center of gravity of the vehicle. The yaw rate signal, scaled with vehicle speed, is an indication of the instantaneous curvature of a road the vehicle 22 is traveling. The yaw rate sensor may be used in determining whether the vehicle 22 has entered a ramp and what type of ramp the vehicle 22 is on, as will be further described below.

The controller 24 also measures the velocity of the vehicle 24 using a speed sensor 32. Although the speed sensor is illustrated as a single sensor, various numbers of sensors may be employed. A suitable speed sensor employs four sensors located at a respective wheel. The speed of the vehicle may be obtained therefrom in a known way similar to that of an anti-lock braking system. The speed sensor may be used by the system 20 not only in adjusting the speed of the vehicle but also in road classification verification.

Additionally, the controller 24 receives a navigation signal from a navigation system 34. The navigation system 34 includes a vehicle positioning module 36 which uses a Global Positioning System 38 and a digital map database 40 to predict a vehicle position and location. The navigation system 34 may perform a map query, thereby, classifying road segments. The navigation signal may also include but is not limited to data on information including: vehicle position, ramp location, speed category, future vehicle path, number of lanes, road type, road inclination, road conditions or other data that may effect whether to adjust the speed of the vehicle 22.

The controller 24 in a preferred embodiment of the present invention also receives a lane change signal from a radar based lane change detector 46. The lane change detector 46 informs the controller 24 of when the vehicle 22 has changed lanes. The lane change signal is used in determining whether the vehicle has entered an exit ramp.

The lane change detector 46 may be of various style. The lane change detector 46 may include the global positioning system 38, radar sensors, infrared sensors, ultrasonic sensors, laser sensors, cameras, or other lane change detection sensors or vision based components. Lane change detector 46 may simply detect a lane change or may track the manner as to which a lane is changed. For example, a computer vision based lane change tracker may monitor lane changes to determine positioning of vehicles on a road or whether a vehicle is departing from a road. The lane change detector 46 may also use various techniques to detect or track a lane change, such as tracking a color, shape, pattern, of a lane marker. Lane change detector 46 may also monitor whether a lane marker is solid or segmented. Lane change detector 46 may also detect metallic, magnetic, or other lane marker and object material or signals in determining a lane change. The lane change detector may monitor objects other than the host vehicle to determine that the host vehicle or target vehicle has changed a lane.

The controller 24 may also use a warning system 48 to alert the operator of impeding objects in response to the object profile, the yaw rate, the speed at the vehicle, the navigation signal, and the operating mode.

The controller 24 in response to the target vehicle signal, the yaw rate signal, the speed of the vehicle 22, the navigation signal, and the lane change signal, determines the system 20 operating mode. Some of the system 20 operating modes are as follows: follow mode, cruise mode, auto resume mode, or inhibit resume mode. Follow mode is when the system 20 is continuously adjusting the speed of the vehicle 22 to remain a headway distance from a target vehicle in the future path of the vehicle 22. During cruise mode the system 20 is continuously adjusting the speed of the vehicle 22 to remain at a set speed. During auto resume mode the system 20 is slowly accelerating the vehicle 22 to a set speed. During inhibit resume mode the system 20 is not accelerating the vehicle 22. After determining the system 20 operating mode, the system 20 using the vehicle accelerator 42 or brakes 44 adjusts the speed of the vehicle 22 accordingly. The system 20 may use the vehicle accelerator 42 or may use mechanical or electrical throttle control device in adjusting the speed of the vehicle 22.

Figure 3:
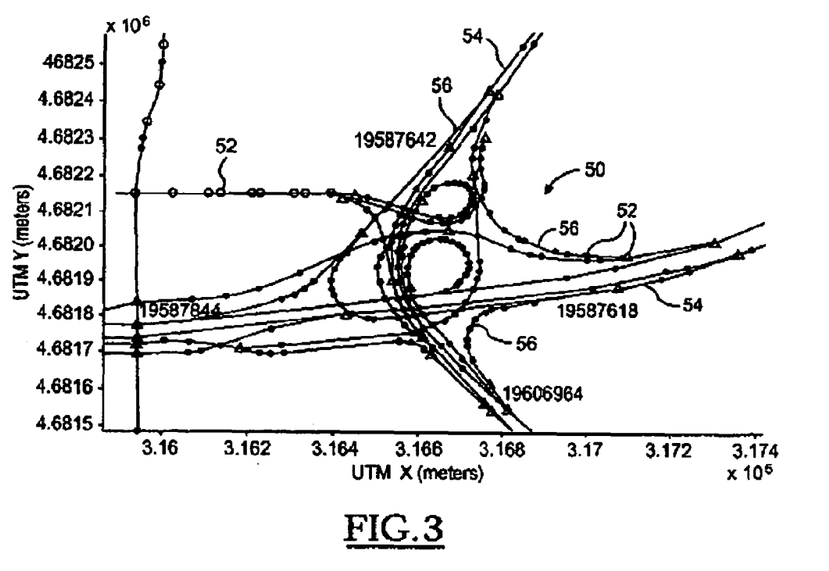
FIG. 3 is a macro-view of a freeway interchange having known coordinate locations represented by various markers according to the present invention.

Referring now to FIG. 3, a macro-view of a freeway interchange 50 having known coordinate locations represented by various markers 52 according to the present invention is shown. Production navigation systems use GPS (global positioning systems), dead reckoning, map matching, and a digital map database to locate a vehicle on a map, and route the vehicle to a destination given a set of routing criteria. Road classification in terms of average travel speed are attached to each road segment 54, which have a start node identification. Road segments are further classified with information pertaining to permissible travel directions such as a one-way street or a divided highway. Ramp signs and ramp classification attributes are attached to ramp sections 56. For example an exit ramp may have a ramp class link of 19587642. The class link refers to the location and classification of a road segment. Thus, it is possible to discriminate between highway and residential streets. Although, the road classification permits straightforward extraction of ramp status from the map database 40, issues with map database 40 inaccuracy and the ability of the navigation system 34 to place the vehicle 22 on the correct road section add uncertainty to ramp detection.

Figure 4A:
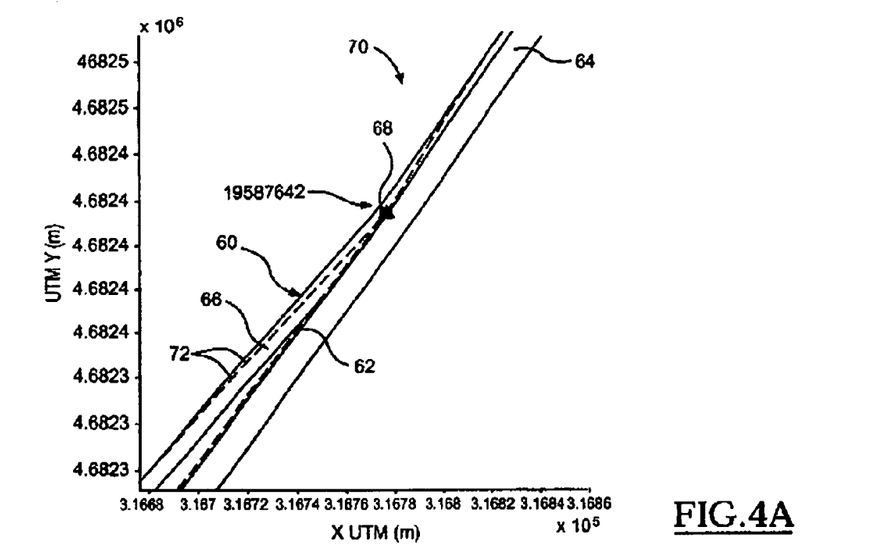
FIG. 4A is a graph illustrating exit ramp locations relative to road survey edges for a single lane transitioning into an exit ramp, which is branching from the single lane according to the present invention.

Referring now to FIG. 4A, a graph illustrating exit ramp locations 60 relative to road survey edges 62 for a single lane 64 transitioning into an exit ramp 66 branching from the single lane 64 according to the present invention. The navigation system 34 searches road segment information for start node identification. The navigation system 34 also searches road segment information for highway and ramp segment pairs that have identical start nodes. An exit ramp is identified in response to an identical start node. Link 19587642 is a ramp class link that branches off the single lane 64, at a location represented by triangle 68 that is part of freeway 70. The map database path is represented by the dashed lines 72. The distance between the map database transition and the actual coordinates of where the exit ramp branches off a freeway varies per exit ramp causing varying inaccuracy in vehicle placement.

Figure 4B:
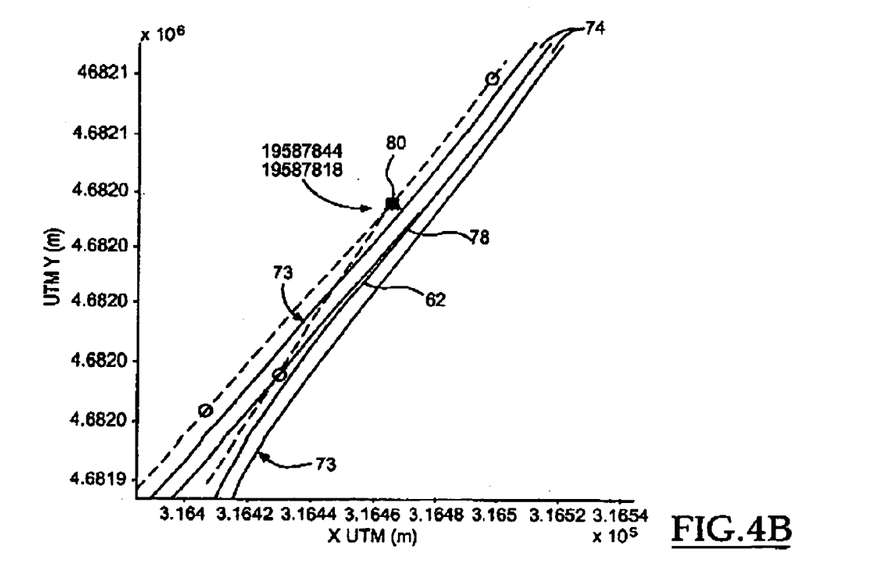
FIG. 4B is a graph illustrating ramp locations relative to road survey edges for two lanes transitioning into two high speed connector ramps 76 according to the present invention.

Referring now to FIGS. 3 and 4B, a graph illustrating ramp locations 73 relative to road survey edges 62 for two lanes 74 transitioning into two high-speed connector ramps 76 according to the present invention is shown. The ramp class link 19587642 transitions to class links 19587844 and class link 19587818. The link transition occurs close to the actual ramp split 78 and is represented by triangle 80.

An additional source of error with navigation system vehicle placement is ramp detection uncertainty due to the ability of the navigation system to place the vehicle 22 longitudinally and laterally along the road. Longitudinal placement errors have the potential to significantly affect the timing of exit ramp detection in the sense that when the vehicle 22 is detected to be placed a distance behind a true vehicle position, the ramp is detected late. Lateral placement errors have the potential to incorrectly place the vehicle 22 on a parallel road to that of which the vehicle is actually traveling on.

Figure 5A:
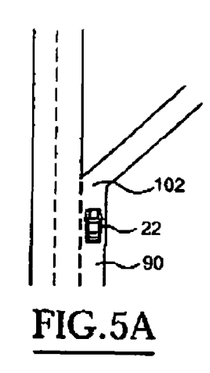
FIG. 5A is a placement diagrammatic view of a navigation induced placement error of a vehicle using a control system operating on an exit only lane in accordance with an embodiment of the present invention.

Referring now to FIG. 5A, a placement diagrammatic view of a navigation induced placement error of a vehicle using an ACC system operating on an exit only lane in accordance with an embodiment of the present invention is shown. The lateral placement errors may arise in three situations. First lateral placement error may arise when the navigation system 34 experiences an "exit only" lane 90 the system 34 does not classify the lane 90 as an exit ramp 102. Therefore, the navigation system 34 begins to operate in cruise resume mode when no target vehicle is detected and accelerates the vehicle 22, while operating in the exit only lane and being directed towards the exit ramp 102, towards the exit ramp 102 and enter the ramp 102 at a higher speed.

Figure 5B:
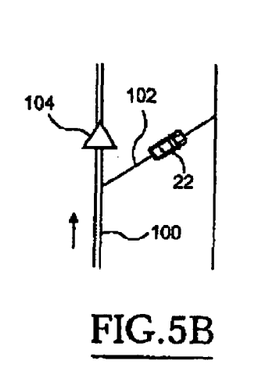
FIG. 5B is a placement diagrammatic view of navigation induced placement error of a vehicle using a control system operating on an exit ramp and predicting the vehicle to be on a previously exited highway in accordance with an embodiment of the present invention.

Referring now to FIG. 5B, a placement diagrammatic view of navigation induced placement error of a vehicle using an ACC system operating on an exit ramp and predicting the vehicle to be on a previously exited highway in accordance with an embodiment of the present invention is shown. Another lateral placement error occurs when the exit ramp 102 gradually branches off from the highway 100, thereby, the navigation system 34 remains predicting the vehicle 22 to be on the highway 100 instead of on the exit ramp 102 represented by triangle 104. Also, inhibit resume mode is not enabled.

Figure 5C:
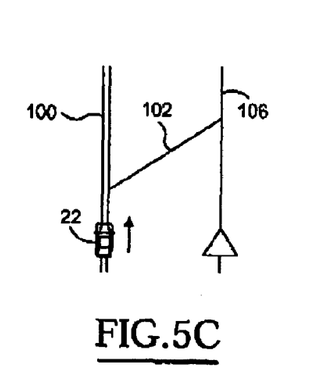
FIG. 5C is a placement diagrammatic view of navigation induced placement error of a vehicle using a control system operating on a highway and predicting the vehicle to be on a close parallel road in accordance with an embodiment of the present invention.

Referring now to FIG. 5C, is a placement diagrammatic view of navigation induced placement error of a vehicle using an ACC system operating on a highway and predicting the vehicle to be on a close parallel road in accordance with an embodiment of the present invention is shown. Finally, a lateral placement error occurs when a parallel road, for example a service drive 106 is near the highway 100 and the navigation system 34 predicts the vehicle 22 to be on the service drive 106 instead of the highway 100, as best shown in FIG. 5C. The final situation may cause the navigation system 34 to not identify an exit ramp for miles.

Figure 6:
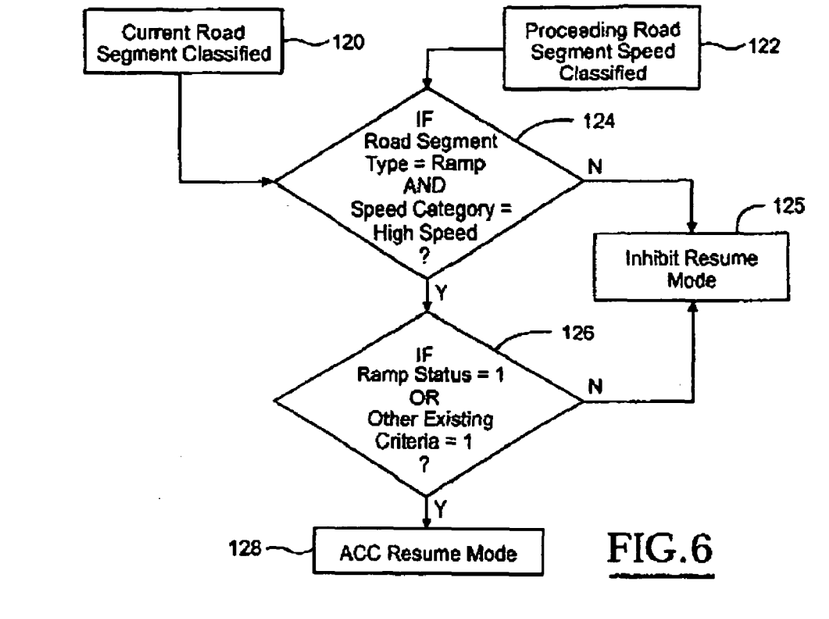
FIG. 6 is a flowchart illustrating a ramp-based approach for resume mode algorithm in accordance with an embodiment of the present invention.

Referring now to FIG. 6, a flowchart illustrating a ramp-based approach for a resume mode algorithm in accordance with an embodiment of the present invention is shown.

In steps 120 and 122, a current road segment and a proceeding road segment speed are classified by the navigation system 34. The system 20 then proceeds to step 124.

In step 124, when the current segment is a ramp and the speed classification is high the vehicle is on a high-speed connector ramp. The system 20 proceeds to step 126. When the road segment is a ramp and the speed classification is low, the vehicle is on an exit ramp. The system 20 then proceeds to step 125 in which an inhibit resume mode is entered. In step 125, the system 20 is in inhibit resume mode. When an exit ramp is detected the system 20 inhibits the resume speed of the vehicle 22 until the vehicle is operating on a road segment that corresponds to the set speed.

Referring again to step 124, ramp status is set to one for a high-speed connector ramp. When ramp status is set to one then step 126 is performed. In step 126, when the ramp is a high-speed connector ramp or some other criteria are met step 128 is performed. In step 128, the system 20 proceeds to operate in resume mode. Otherwise when a ramp is detected and the ramp status value is zero or some other criteria is met step 125 is performed.

Figure 7:
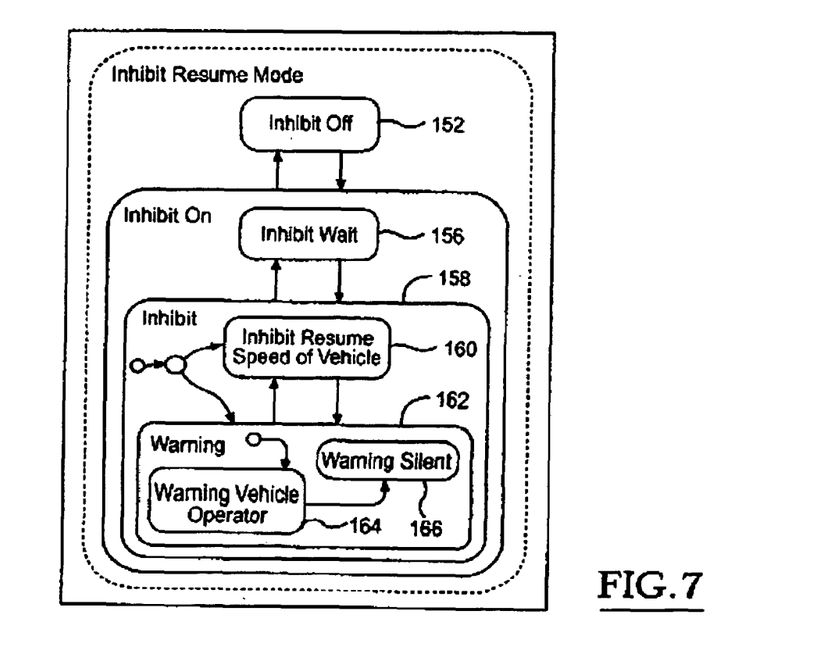
FIG. 7 is a stateflow diagram illustrating control logic for ramp based InhibitResume mode in accordance with an embodiment of the present invention.

Referring now to FIG. 7, a stateflow diagram illustrating control logic for ramp based inhibit resume mode in accordance with an embodiment of the present invention is shown. The system 20 has two main states, during inhibit resume mode, inhibit on state 150 and inhibit off state 152.

In the inhibit off state 152, the system 20 disables inhibit resume based on an operator selection or when the navigation system 34 is not providing reliable positioning. Otherwise inhibit on state 150 is performed.

In the inhibit on state 150, the system 20 waits for a ramp flag to be set equal to one in which a inhibit on state 150 is performed or, a logic "OR" gate is represented by circle 154, the ramp flag is set to zero in which a inhibit wait state 156 is performed.

In the inhibit wait state 156, the system 20 waits until a ramp is detected and the ramp flag is set equal to one. When the ramp flag is equal to one, the inhibit state 158 is performed.

In the inhibit state 158, the system 20 starts an inhibit resume state 160 when a timer is equal to zero, otherwise a warning state 162 is performed.

In state 160, the system continues to inhibit resume speed of the vehicle 22. The warning state 162 is performed when the timer value is greater than a predetermined value and navigation system 34 decides to warn the operator.

In the warning state 162, the system 20 is operating in a warning state 164 or a warning silent state 166. In the warning state 164, the system warns the operator that inhibit resume is active after a predetermined time delay. The controller 24 may use the warning system 48 to alert the operator. The warning system 48 allows the operator to have ample time to react when necessary. A warning silent state 166 is performed after the warning signal to the operator has occurred for a time period greater then a preset time duration.

In the warning silent state 166, the system ceases to warn the operator and returns back to the state 160.

Figure 8:
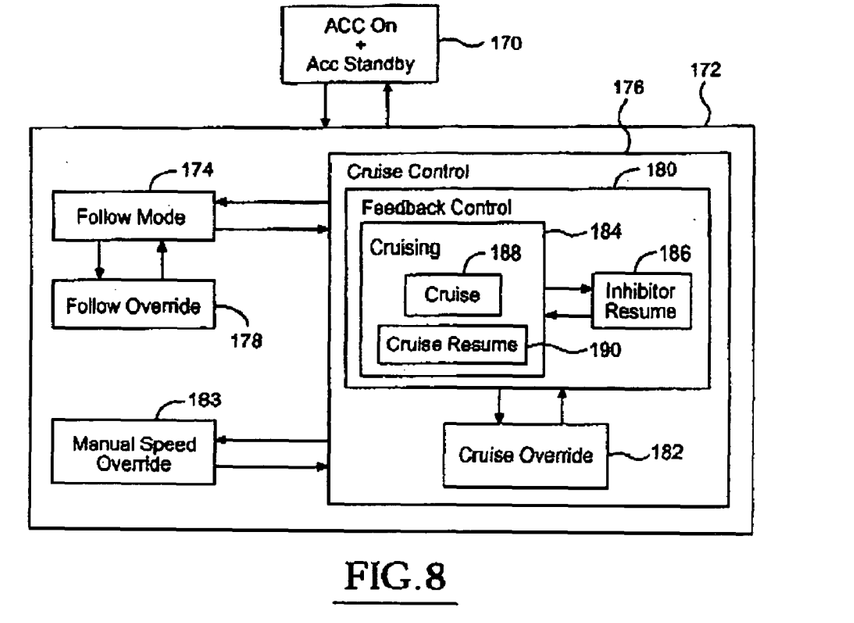
FIG. 8 is a stateflow diagram illustrating control logic for inhibit resume as implemented in the ACC follow mode control according to an embodiment of the present invention.

Referring now to FIG. 8, a stateflow diagram illustrating control logic for inhibit resume as implemented in the ACC follow mode control according to an embodiment of the present invention is shown.

In initialization state 170, the system 20 is powered on, initialized, and the set speed is set manually by the operator. The system 20 is waiting for a ramp flag and continuously monitoring for a target vehicle.

In ACC active state 172, the system 20 operates in either a follow control state 174 or cruise control state 176.

In the follow control state 174, the vehicle 22 is following a target vehicle and adjusting the vehicle speed to remain a predetermined distance from the target vehicle as known in the art.

In the follow override state 178, the follow control state 174 is overridden by either the detection of a target vehicle, the detection of an exit ramp, or manually overridden by the operator.

In the cruise control state 176 the system 20 is operating the vehicle 22 at the set speed until a target vehicle is detected, an exit ramp is detected, or other vehicle characteristic overrides the cruise control state 176. In the cruise control state 176, the system 20 is further operating in a feedback control state 180 or a cruise override state 182.

In the feedback control state 180, the system 20 is operating in either a Cruising state 184 or an inhibit resume state 186.

In the cruising state 188, the vehicle 22 is cruising at the set speed shown by box 188 or adjusting the vehicle speed accordingly to maintain the set speed shown by box 190.

In the inhibit resume state 186, when an exit ramp is detected the system 20 inhibits the resume speed of the vehicle 22 until the vehicle is operating on a road segment that corresponds to the set speed. During inhibit resume, vehicle speed is held constant.

In the cruise override state 182, the feedback control state 180 may be overridden by manual control, shown by box 183. The operator may manually adjust the speed of the vehicle 22, cancel the set speed, or may power off the system 20 altogether.

The present invention uses not only a navigation system 34 but also a radar based lane change detector 46 for vehicle position prediction. The lane change detector 46 provides a flag to the ACC control logic that indicates when the vehicle 22 has moved laterally left or right a distance commensurate of approximately half a lane change. The lane change detector 46 may have tracking errors that may lead to false lane change indications. The false lane change indications are not a major problem since the near ramp and ramp direction conditions must match before the system 20 inhibits its resume speed of the vehicle 22, therefore minimizing the number of false indications. Also when the system 20 is not in resume mode any false lane change indications are not relayed to the operator, since the system 20 is already operating in an inhibit resume state 186 or Cruising state 184 in which when any lane change occurs the system 20 is already in a non-acceleration state. When lane changes are missed by the lane change detector 46, the system 20 waits until the navigation system 34 places the vehicle 22 on an exit ramp. Missed lane changes occur less frequently than false indications.

The navigation system 34 provides information that a ramp is nearby. Ramp proximity is an indirect result of the map matching process that determines the most probable vehicle position. The system 20 uses input information such as vehicle speed, yaw rate, GPS data, and map data in conjunction with algorithms within the vehicle position module to determine up to fifteen possible vehicle positions (candidates) on a digital map. In the process of selecting the most probable vehicle position, map matching forms a list of probable candidate positions. A "swarm" of positions are created around the most probable position. Each candidate is assigned a probability. The candidate with the highest probability is the "best" candidate. The "best" candidate represents the predicted vehicle position. When a candidate, in the swarm of candidates, is on an exit ramp, a ramp can be flagged as being nearby, but as discussed above the system 20 would trigger inhibit resume.

Figure 9:
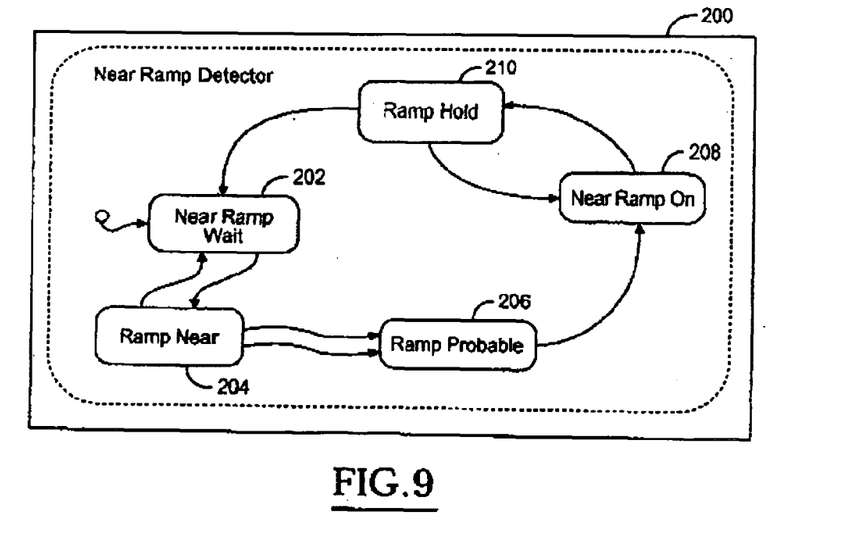
FIG. 9 is a stateflow diagram illustrating control logic for a candidate method of ramp detection in accordance with an embodiment of the present invention.

Referring now to FIG. 9, a stateflow diagram illustrating control logic for a candidate method of ramp detection in accordance with an embodiment of the present invention is shown.

In near ramp detector state 200, the system 20 is monitoring the navigation signal and the lane change detector 46 to determine whether the vehicle 22 is near an exit ramp. When the system 20 determines that the vehicle 22 is near an exit ramp a near ramp wait state 202 is performed.

In the near ramp wait state 202, the system 20 sets a near ramp flag equal to one when the vehicle 22 is near an exit ramp or near ramp flag equal to zero when the vehicle 22 is no longer near an exit ramp. When the near ramp flag is equal to one, ramp near state 204 is performed.

In the ramp near state 204, the system 20 determines whether the exit ramp is upcoming on the left side of the vehicle 22 or the right side of the vehicle 22. When the exit ramp is on the left side of the vehicle 22 a ramp left flag is set equal to one. When the exit ramp is on the right side of the vehicle 22 a ramp right flag is set equal to one. When the near ramp flag is equal to one the system 20 then proceeds to the ramp probable state 206 otherwise the system 20 returns to the near ramp wait state 202.

In the ramp probable state 206, an exit ramp has been detected and a near ramp flag is set equal to one. The system 20 then proceeds to perform a near ramp on state 208 and the ramp hold state 210.

In the near ramp on state 208 and the ramp hold state 210, an iterative process continues until the vehicle 22 is no longer near the exit ramp and the duration of the time the vehicle 22 was near the exit ramp is greater than a predetermined ramp hold time. When the vehicle 22 is near the exit ramp the NearRamp flag remains equal to one. Ramp direction information is combined with the lane change detector information to determine whether a left or right lane change has occurred in order to infer that an exit ramp has been taken. When the vehicle 22 is no longer near the exit ramp, past the entrance of the exit ramp, or on the exit ramp the near ramp flag is set equal to zero. When the near ramp flag is equal to zero a ramp timer begins counting time until the counted time is greater than the predetermined hold time at which the system 20 returns to the near ramp wait state 202.

To increase the accuracy of the system 20 more information is extracted from the map database. Each road segment in the map database has a heading component, whereby the system 20 using the data calculates the direction of the exit ramp with respect to the highway. Thus it is possible to determine whether the ramp exits to the left or to the right.

Figure 10:
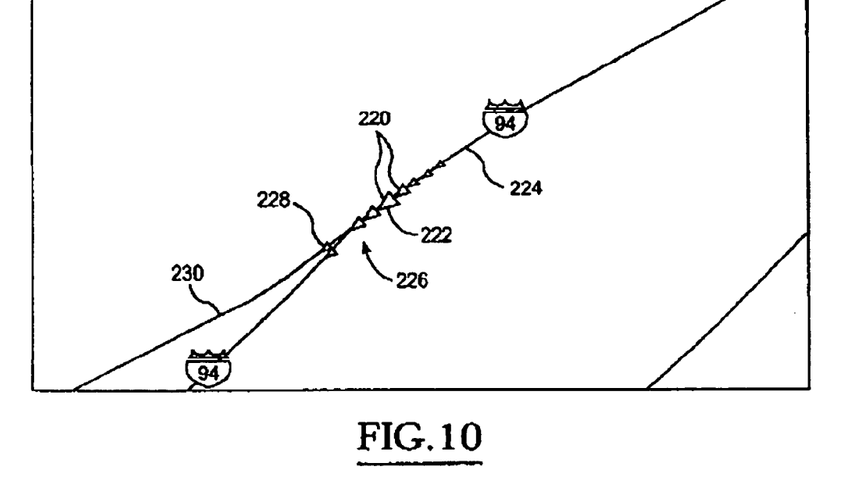
FIG. 10 is a vehicle position overlay on a map illustrating a navigation system exit ramp prediction, using the candidate method, for a vehicle on a road approaching an exit ramp according to an embodiment of the present invention.

Referring now to FIG. 10, a vehicle position overlay on a map illustrating a navigation system exit ramp prediction, using the candidate method, for a vehicle on a road approaching an exit ramp according to an embodiment of the present invention is shown. The triangle symbols 220 represent each candidate's position and point in the direction of travel of the vehicle 22. Triangle 222 with a dark border represents the best probable candidate. In FIG. 11 the candidates are lined up along the highway segment 224 with the best candidate 222 located near the center of the swarm 226. Of course other candidate swarm patterns are created for different road segments. The larger the triangle the higher the probability value. Note that a candidate 228 is on an exit ramp 230, in which the system 20 determines the vehicle 22 is near the exit ramp 230.

Figure 11A:
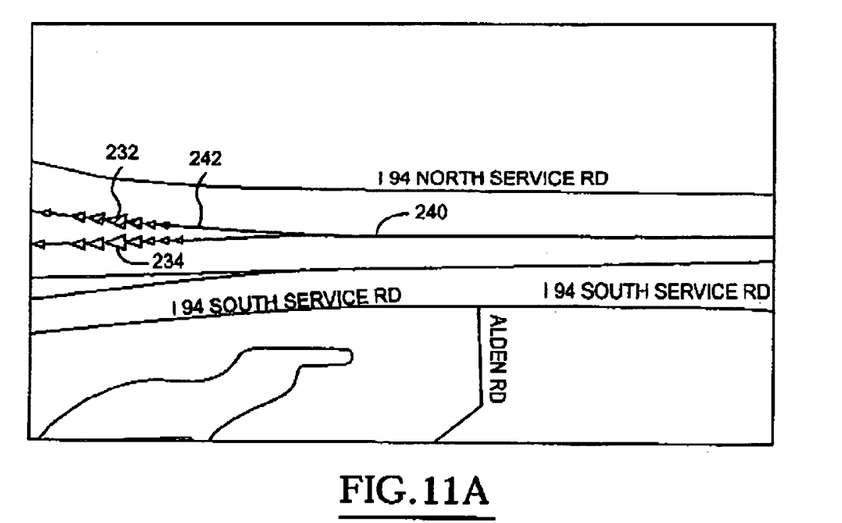
FIG. 11A is a vehicle position overlay on a map illustrating an incorrect navigation system vehicle prediction location event for a vehicle near an exit ramp according to an embodiment of the present invention.
Figure 11B:
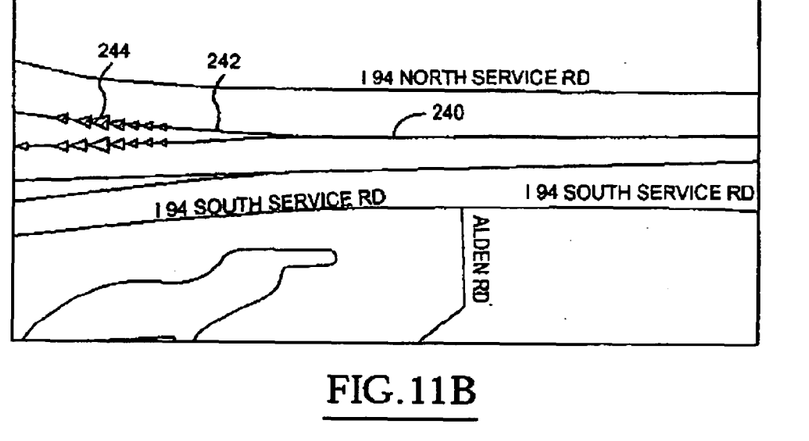
FIG. 11B is a vehicle position overlay on a map illustrating a next time sequence from the event in FIG. 12A of a correct navigation system vehicle prediction location according to an embodiment of the present invention.

Referring now to FIGS. 11A and 11B, illustrating a potential problem of when vehicle 22 is operating on an exit ramp, represented by triangle 232, and yet the navigation system 34 continues to predict the vehicle position to be on the highway 240, represented by triangle 234 (similar to the problem illustrated in FIG. 5B). However, the problem is overcome by using the candidate prediction method, in which the navigation system 34 is able to detect that there is an exit ramp 242 nearby and whether the exit ramp 242 is on the left side or the right side of the vehicle 22. When the vehicle 22 changes lanes to operate on the exit ramp 242 the system corrects this problem by assuming the vehicle 22 is on the exit ramp 242, represented by triangle 244 and the system inhibit resume speed of the vehicle 22.

Figure 12:
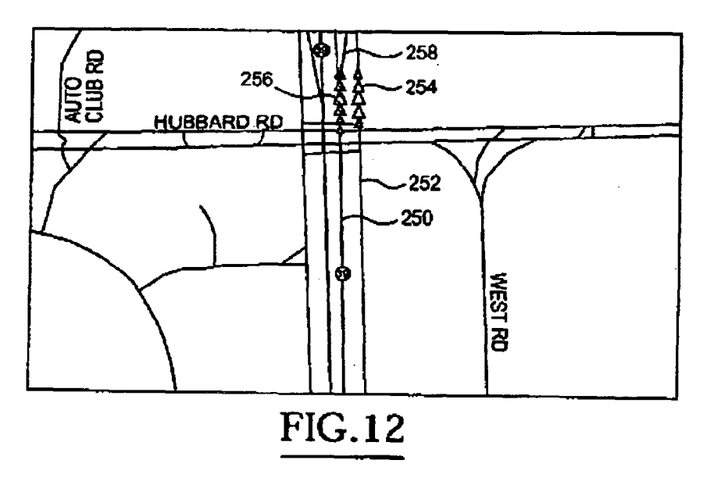
FIG. 12 is a vehicle position overlay on a map illustrating navigation system misplaced position data for a vehicle, on a highway that is parallel to a side road according to an embodiment of the present invention.

Referring now to FIG. 12, a vehicle position overlay on a map illustrating another potential problem with using a navigation prediction system alone and misplacing the vehicle position on a highway 250 that is parallel to a side road, such as a service drive or frontage road, according to an embodiment of the present invention is shown (similar to the problem illustrated in FIG. 5C). The triangles 254 represent incorrect "best" candidate predicted vehicle positions showing the vehicle to be on a side road. The triangles 256 represent other correct candidate positions. This problem is solved by also looking at both the candidate positions and the lane change detection signal. Therefore, when a candidate is approaching exit ramp 258 from a highway, and the lane change detector detects a lane change in the correct corresponding direction of that exit ramp 258 the system 20 may assume the vehicle 22 is on the exit ramp 258. The candidate method may also be used when the ramp has minimal curvature or small ramp departure angle with respect to the highway.

Figure 13:
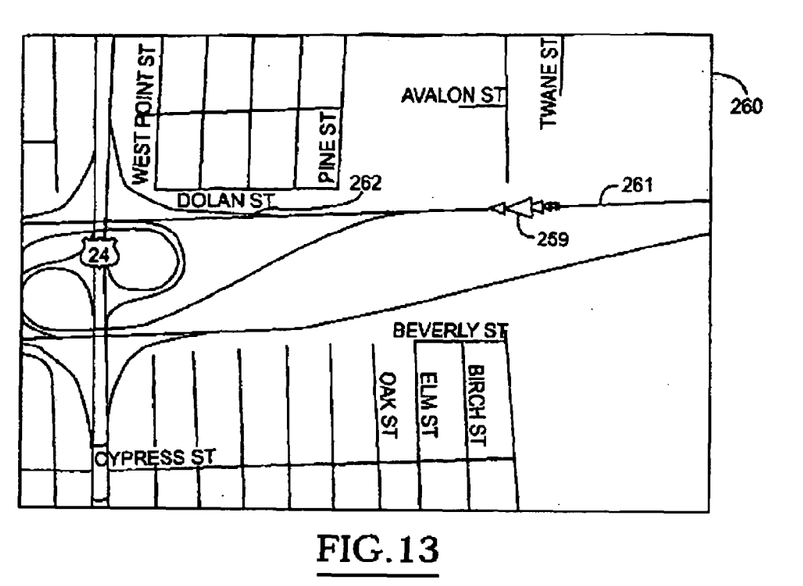
FIG. 13 is a vehicle position overlay on a map illustrating a navigation system exit ramp prediction, using a successor method, for a vehicle on a road approaching an exit ramp according to an embodiment of the present invention.

Referring now to FIG. 13, a vehicle position overlay 259 on a map 260 illustrating a navigation system exit ramp prediction, using a successor method, for a vehicle 22 on a road 261 approaching an exit ramp 262 according to an embodiment of the present invention is shown. The successor method provides added benefits to the candidate method. The successor method increases the "preview distance" of the navigation system 34 so as to monitor for exit ramps earlier. The successor method provides for early detection when there is an exit only lane just before an exit ramp 262 (similar to the problem illustrated in FIG. 5A). Without the successor method the vehicle may remain in cruise mode or resume mode while in the exit only lane. The successor method provides for inhibit resume while the vehicle 22 is in an exit only lane.

Figure 14:
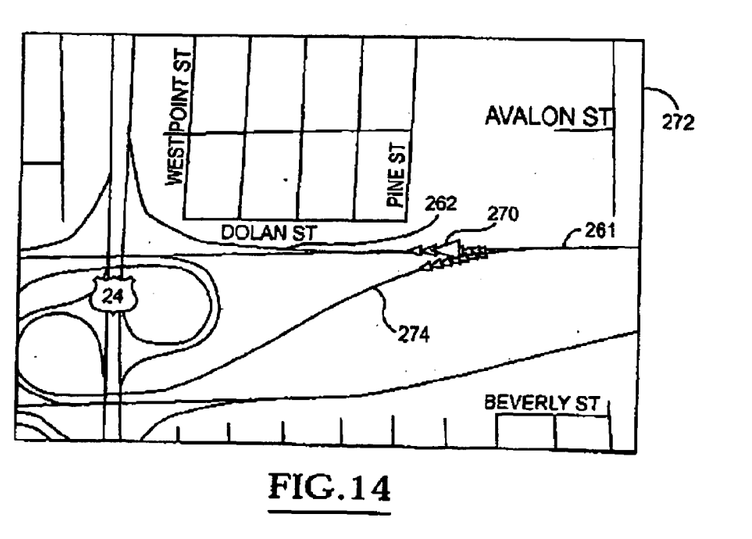
FIG. 14 is a vehicle position overlay on a map illustrating a navigation system exit ramp prediction, using both the candidate and successor methods, for a vehicle on a road near an exit ramp according to an embodiment of the present invention.

Referring now to FIG. 14, a vehicle position overlay 270 on a map 272 illustrating a navigation system exit ramp prediction, using both the candidate and successor methods, for a vehicle 22 on a road 261 near an exit ramp 262 according to an embodiment of the present invention is shown. The candidate method detects the exit ramp 274 on the left and the successor method detects the next exit ramp 262 on the right. Depending upon the detected lane change, the navigation system 34 positions the vehicle 22 on the left exit ramp 274, on the highway 261, or on the right exit ramp 262.

The yaw rate sensor 30 may be used in combination with the above mentioned methods to detect road curvature and further increase the prediction accuracy for exit ramps.

Implementation of inhibit resume during exit ramp detection provides an additional safety enhancement to traditional cruise control systems. The present invention introduces exit ramps and situational awareness information into a control system in a useful manner that enhances operator comfort and safety without detracting from current performance standards.

The above-described method, to one skilled in the art, is capable of being adapted for various purposes and is not limited to the following applications: cruise control systems, forward collision warning systems, collision avoidance systems, vehicle systems, or other systems that may require adaptive speed control. The above-described invention may also be varied without deviating from the true scope of the invention.

The invention claimed is:

1. A method of adaptively controlling the speed of an automotive vehicle having a controller comprising:
    detecting a ramp with the controller comprising;
    determining a position of an exit ramp comprises;
    examining road segment information for highway and ramp classifications;
    searching road segment information for start node identification;
    searching stored data for highway and ramp segment pairs that have identical start nodes; and
    identifying an exit ramp in response to said identical start nodes;
    establishing a heading component of said exit ramp;
    determining that the automotive vehicle has changed lanes; and
    determining that the automotive vehicle is on said exit ramp in response to said position, said heading component, and the automotive vehicle changing lanes;
    establishing a heading component of said ramp comprising at least one of ramp curvature and ramp departure angle; and
    adjusting the automotive vehicle speed, relative to a set speed, in response to said ramp and said heading component.

2. A method as in claim 1 wherein determining a position of an exit ramp comprises:
    determining probable candidate positions;
    selecting a best candidate position from said probable candidate positions;
    determining a candidate position of said probable candidates positions is on an exit ramp; and
    establishing the position of the automotive vehicle relative to the position of an exit ramp.

3. A method as in claim 2 wherein selecting a best candidate position comprises:
    determining possible candidate positions using tools selected from the following group comprising: vehicle speed, yaw rate, GPS data, map data, navigation data, and a combination thereof;
    assigning a probability to each possible candidate position; and
    determining the possible candidate with the highest probability and labeling that candidate the best candidate.

4. A method as in claim 1 wherein establishing a heading component of said exit ramp comprises determining a direction of said exit ramp in relation to a road segment.

5. A method of adaptively controlling the speed of an automotive vehicle having a controller comprising:
    detecting a ramp with the controller comprising;
    determining a position of an exit ramp;
    establishing a heading component of said exit ramp;
    determining that the automotive vehicle has changed lanes; and
    determining that the automotive vehicle is on said exit ramp in response to said position, said heading component, and the automotive vehicle changing lanes;
    establishing a heading component of said ramp comprising at least one of ramp curvature and ramp departure angle;
    adjusting the automotive vehicle speed, relative to a set speed, in response to said ramp and said heading component; and
    inhibiting resume speed of the automotive vehicle, when the automotive vehicle is determined to be on an exit ramp or near an exit ramp, for a prescribed period of time.

6. A method of adaptively controlling the speed of a automotive vehicle having a controller comprising:
    detecting an exit ramp;
    determining a position of an exit ramp;
    establishing a heading component of said exit ramp comprising at least one of ramp curvature and ramp departure angle;
    determining the automotive vehicle has changed lanes;
    determining that the automotive vehicle is on an exit ramp in response to the position of said exit ramp, said heading component, and the automotive vehicle changed lanes; and
    inhibiting resume speed, relative to a set speed, of the automotive vehicle in response to detection of said exit ramp and said heading component.

7. A method of adaptively controlling the speed of an automotive vehicle having a controller comprising:
    detecting a ramp with the controller;
    determining a position of said ramp comprising;
    examining road segment information for highway and ramp classifications;
    searching road segment information for start node identification;
    searching stored data for highway and ramp segment pairs that have identical start nodes; and
    identifying an exit ramp in response to said identical start nodes;
    determining that the automotive vehicle is on said ramp in response to said position; and
    adjusting the automotive vehicle speed, relative to a set speed, in response to said ramp.

8. A method as in claim 7 further comprising:
    establishing a heading component of said ramp;
    determining that the automotive vehicle has changed lanes; and
    determining that the automotive vehicle is on said ramp in response to said heading component and said lane change determination.

* * * * *